US011805470B2

(12) United States Patent
Kwon et al.

(10) Patent No.: US 11,805,470 B2
(45) Date of Patent: Oct. 31, 2023

(54) WIRELESS DEVICE IN A MULTI-LINK DEVICE (MLD) ARRANGED TO REDUCE DUPLICATION OF MULTI-LINK OPERATION (MLO) INFORMATION AND BASIC SERVICE SET (BSS) INFORMATION AND METHODS

(71) Applicant: NXP USA, Inc., Austin, TX (US)

(72) Inventors: Young Hoon Kwon, Laguna Niguel, CA (US); Liwen Chu, San Ramon, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 167 days.

(21) Appl. No.: 17/321,477

(22) Filed: May 16, 2021

(65) Prior Publication Data

US 2021/0368419 A1  Nov. 25, 2021

Related U.S. Application Data

(60) Provisional application No. 63/026,952, filed on May 19, 2020.

(51) Int. Cl.
*H04W 40/24* (2009.01)
*H04W 76/11* (2018.01)
*H04W 84/12* (2009.01)

(52) U.S. Cl.
CPC .......... *H04W 40/248* (2013.01); *H04W 76/11* (2018.02); *H04W 84/12* (2013.01)

(58) Field of Classification Search
CPC ... H04W 40/248; H04W 76/11; H04W 84/12; H04W 88/08
See application file for complete search history.

(56) References Cited

U.S. PATENT DOCUMENTS

2020/0221545 A1\* 7/2020 Stacey .................. H04W 48/16
2021/0014776 A1\* 1/2021 Patil ...................... H04L 1/1621

OTHER PUBLICATIONS

IEEE 802.11-20/0357r0, "Container for Advertising ML Information," Qualcomm, Mar. 15, 2020, 27 pages.
IEEE 802.11-19/0358r0, "Multi-BSSID Operation with MLO," Qualcomm, Mar. 15, 2020, 13 pages.

\* cited by examiner

*Primary Examiner* — Mohammad S Anwar (57) ABSTRACT

A reduced neighbor report (RNR) element is generated. The generated RNR element includes multi-link device operation (MLO) information of least one neighboring wireless device to a reporting wireless device. In examples, the MLO information defines information of a respective multi-link device (MLD) which each at least one neighboring wireless device to the reporting wireless device is affiliated. A multilink (ML) element is also generated. The generated ML element includes basic service set (BSS) information of each of at least one wireless device affiliated to an MLD where the reporting wireless device is affiliated to the same MLD. The reporting wireless device transmits a frame which comprises the generated RNR element and the generated ML element, where the generated ML element does not include any other RNR element.

20 Claims, 6 Drawing Sheets

WIRELESS DEVICE IN A MULTI-LINK DEVICE (MLD) ARRANGED TO REDUCE DUPLICATION OF MULTI-LINK OPERATION (MLO) INFORMATION AND BASIC SERVICE SET (BSS) INFORMATION AND METHODS

RELATED APPLICATION

This application claims a benefit of priority to U.S. Provisional Application No. 63/026,952, entitled "Apparatus and Methods for Indicating BSS Information in a Wireless Communication Systems" filed May 19, 2020, the contents of which are incorporated herein by reference in its entirety.

FIELD OF USE

This disclosure generally relates to wireless communication, and more particularly to a wireless device of a multi-link device (MLD) arranged to reduce duplication of multi-link operation (MLO) information and basic service set (BSS) information and methods.

BACKGROUND

A communication system operating in accordance with WiFi based on the Institute of Electrical and Electronics Engineers (IEEE) 802.11 family of standards, specifically the IEEE 802.11be standards, defines and enables a multi-link device (MLD). A plurality of wireless devices, specifically mobile stations (non-AP STAs) or access points (APs), are affiliated with the MLD. An MLD with a plurality of APs affiliated with the MLD is referred to as an AP MLD and an MLD with a plurality of non-AP STAs affiliated with the MLD is referred to as a non-AP MLD. The MLD has at least a part of a media access control (MAC) layer of an open systems interconnect (OSI) communication model shared by the two or more non-AP STAs or the two or more APs. Further, a wireless link allows an AP of the MLD or non-AP STA of the MLD to exchange data with wireless devices in one or more bands of a plurality of communication bands (i.e., frequency bands).

The drawings are for the purpose of illustrating example embodiments, but it is understood that the embodiments are not limited to the arrangements and instrumentality shown in the drawings.

DETAILED DESCRIPTION

The description that follows includes example systems, methods, techniques, and program flows associated with a multi-link device (MLD) such as an access point (AP) MLD or non-AP MLD of a communication system. The MLD is arranged to indicate among other information multi-link operation (MLO) information or basic service set (BSS) information of a wireless device such as APs or mobile stations (non-AP STAs) in a frame transmitted by the communication system. The MLO or BSS information of a wireless device is indicated without duplication in one or more of a reduced neighbor report (RNR) element, multi-link (ML) element, or multi basic service set identifier (MBSSID) element in the frame.

Figure 1:
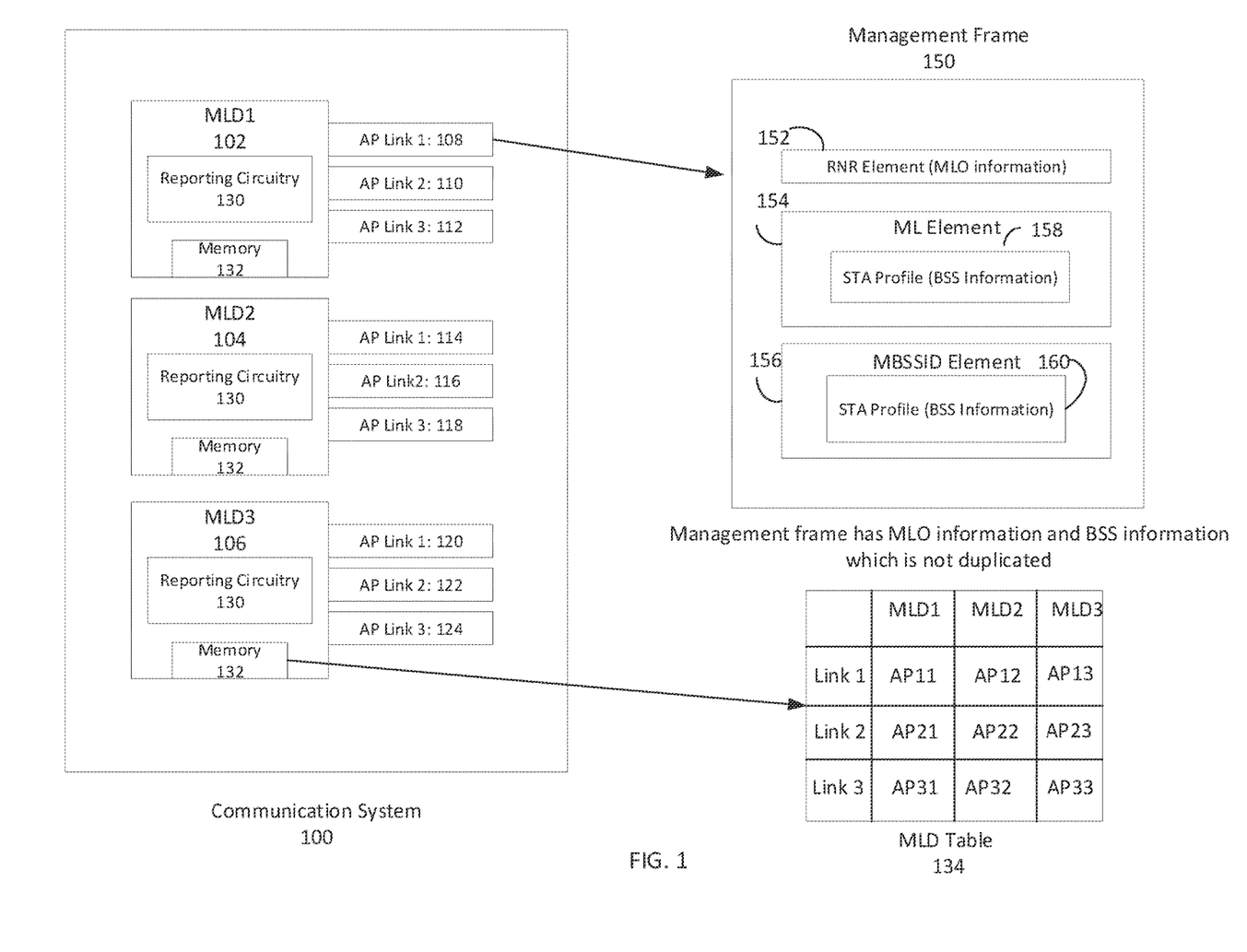
FIG. 1 is an example block diagram of an example communication system arranged with a plurality of multi-link devices (MLDs) which transmit management frames having multi-link operation (MLO) information and/or basic service set (BSS) information of a wireless device.

FIG. 1 describes an example block diagram of an example communication system 100 arranged with a plurality of MLDs which are shown as MLD1 102, MLD2 104, and MLD3 106. In examples, the MLD is defined by the Institute of Electrical and Electronics Engineers (IEEE) 802.11 family of standards, specifically the IEEE 802.11be standard, which defines WiFi communications for Extra High Throughput (EHT) Wireless Local Area Networking (WLAN). The wireless network 100 shows three MLDs, but in other examples the communication system 100 may include more than three MLDs or less than three MLDs.

A communication system 100 may include access points (AP) which are shown and mobile stations (non-AP STA) which are not shown. The non-AP STA may be an end device which wirelessly communicates with an AP by a wireless network protocol such as 802.11, while the AP may allow connections by nearby devices such as non-AP STA to access a network such as the Internet via the wireless network protocol.

One or more wireless devices which performs wireless communication over one or more links may be affiliated with an MLD. As an example, wireless devices in the form of a plurality of access points (APs) identified as AP 108, AP 110, AP 112 are affiliated with MLD1 102. Similarly, wireless devices in the form of a plurality of APs identified as AP 114, AP 116, and AP 118 are affiliated with MLD2 104. Still similarly, wireless devices in the form of a plurality of APs identified as AP 120, AP 122, and AP 124 are affiliated with MLD3 106. The plurality of MLDs each share a common media access control (MAC) processing circuitry associated with a MAC layer of an open systems interconnect (OSI) communication model with the APs affiliated with a respective MLD. Each AP implements lower layers of the MAC layer and a physical layer of the OSI to facilitate wireless communication over a respective link identified as link 1, link 2, or link 3 in the communication system 100. Each link may be a different wireless channel such as a 20 MHz channel on a 5 GHz or 6 GHz spectrum associated with WiFi communication. Each AP may include a transceiver with transmitter signal path and a receiver signal path and the transceiver may be coupled to a respective antenna. The links may each support bi-directional communication. A plurality of AP affiliated with an MLD is referred to as an AP MLD.

The communication system 100 may include fewer or more AP MLDs than as shown in FIG. 1 with different number of links. Additionally, or alternatively, the communication system 100 may include wireless devices in the form of non-AP STAs affiliated with non-AP MLDs (not shown) arranged in a manner similar the AP MLDs described herein.

A basic service set (BSS) is a network topology that allows wireless devices to communicate. BSS information may include capabilities and operating parameters of a BSS associated with a wireless device such as one or more of a number of channels of the BSS, a BSS identification (BSSID) of the BSS, or service set identifier (SSID) of the BSS, among other examples. The wireless devices communicate via an MLD. Multi-link operation (MLO) information defines information of an MLD to which a wireless device is affiliated. The MLO information may include one or more of an MLD identifier which uniquely identifies the MLD, a link identifier which uniquely identifies a link of the MLD, or an MLD change indication which indicates a change to an MLD configuration, among other examples.

MLD operation includes reporting MLO information and/or BSS information of a wireless device. The MLD1 102 has reporting circuitry 130 to facilitate reporting the MLO information and the BSS information. In examples, the MLD including the reporting circuitry 130 may be implemented using circuitry such as analog circuitry, mix signal circuitry, memory circuitry, logic circuitry, processing circuitry arranged to execute code stored in a memory and when executed by the processing circuitry perform the disclosed functions, or combinations thereof. A wireless device which reports the information to another wireless device is a reporting wireless device and the wireless device about which the information is associated is a reported wireless device. In the communication system 100, the AP which reports the information is a reporting AP and the APs which the information relates to is a reported AP. The MLD may store in memory 132 a table 134 which identifies APs in the communication system 100 by link identifier and MLD identifier. The memory 132 in each MLD may be the same physical memory or different physical memory which defines the table 134. In the example communication system 100, the example nine APs 108-122 are referenced as AP_ij where i and j are integers which identify a link and MLD associated with an AP. In an example, the AP_ij may be co-located in the communication system 100 because they are implemented in a same physical device, "i" is an integer 1, 2, or 3 which corresponds to link 1, link 2, or link 3 which an AP uses to communicate, and "j" is an integer 1, 2, or 3 which corresponds to MLD1, MLD2, MLD3 with which the AP is affiliated. For example, AP11 corresponds to an AP on link 1 and affiliated with MLD1. As another example, AP22 corresponds to an AP on link 2 and affiliated with MLD2. Other APs may be similarly identified.

A reporting wireless device may transmit a management frame over a link used to establish or maintain communication over the BSS. The management frame 150 may include one or more of a reduced neighbor report (RNR) element 152, a multi-link (ML) element, and multiple BSS identification (MBSSID) element of 802.11be to provide the MLO information or BSS information of a wireless device.

The RNR element 152 is a data structure or field of the management frame 150 for reporting MLO information of at least one neighboring wireless device to a wireless device. The neighboring wireless devices may be on other links to the wireless device in the communication system 100. If the MLD is an AP MLD, then a reporting AP of the MLD such as AP11 generates an RNR element with MLO information of neighboring APs such as AP21, AP22, AP23, AP31, AP32, and AP33 that are on other links to AP11. In examples, the reporting AP transmits the management frame 150 and may configure the management frame 150 with the RNR element 152.

The ML element 154 is a data structure or field of the management frame 150 for reporting BSS information of wireless devices over a link. The ML element 154 may include basic service set (BSS) information of at least one wireless device affiliated with an MLD. Affiliated means that the wireless device is part of the MLD and/or shares same upper MAC layers of the MLD. For example, AP 108, 110, 112 are affiliated with MLD1 but not MLD2. If the MLD is an AP MLD, then a reporting AP of the MLD generates the ML element to provide the BSS information of other APs affiliated with the MLD on a link different from the reporting AP. The ML element 154 comprises zero or more STA profiles 158 which are data structures or fields of the management frame 150 in the form of subelements of the ML element 154 to carry the BSS information of affiliated APs (i.e., the STA profiles in the ML element are also called per-STA profile subelements). For example, AP11 as a reporting AP may include the ML element in the management frame and the ML element may include BSS information of the other APs affiliated with the MLD (AP21 and AP31) in different STA profiles. In some situations, the ML element could also include an RNR element or another ML element that would be included in a management frame transmitted by a reported AP. For example, the STA profile of reported AP21 in an ML element may include an RNR element which includes MLO information of AP11, AP12, AP13, AP31, AP32, and AP33. As another example, the STA profile of reported AP31 in an ML element may include an RNR element which includes MLO information of AP11, AP12, AP13, AP21, AP22, and AP23. As yet another example, the STA profile of reported AP21 in an ML element may include an ML element with BSS information of AP11 and AP31. As another example, the STA profile of reported AP31 in an ML element may include an ML element with BSS information of AP11 and AP12.

A BSS identifier (BSSID) may identify a BSS associated with a wireless device. Further, a BSSID is uniquely associated with a BSS. An AP may be a physical AP which transmits and receives management frames or be composed of one or more virtual AP. Of the one or more virtual APs, one virtual AP broadcasts a management frame such as a beacon frame and a BSSID corresponding to this virtual AP is called a "transmitted BSSID." The one or more virtual APs which do not broadcast a management frame have BSSIDs called a "non-transmitted BSSID." The management frame sent by the virtual AP corresponding to the transmitted BSSID includes BSS information of non-transmitted BSSIDs and the BSS of the virtual AP with the transmitted BSSID In examples, management frame 150 may have an MBSSID element 156 of 802.11be which is a data structure or field to report BSS information of the BSS(s). The MBSSID element 156 comprises one or more STA profiles 160 which are data structures or field of the management frame 150 in the form of subelements of the MBSSID element 156 to carry the BSS information of other wireless devices (e.g., having non-transmitted BSSIDs and/or transmitted BSSIDs) on a same link from a reporting AP. (i.e., the STA profiles in the MBSSID element are also called non-transmitted BSSID profile subelements). For example, AP11 which is a reporting AP may report BSS information of AP12 and AP13 on link 1 in an MBSSID element. As another example, AP21 which is a reporting AP may report BSS information of AP22 and AP23 on link 2 in an MBSSID element.

A wireless device transmits a frame 150 with one or more of the RNR element 152, ML element 154, and MBSSID element 156. It is possible that same BSS information and/or MLO information of a wireless device is included in different elements of the management frame 150, which results in duplication of the information. Embodiments described herein are directed to management frames which indicates one or more of an RNR element, ML element, or MBSSID element having only one instance of the BSS information and/or MLO information of a wireless device. In one example and to avoid duplication of MLO information, transmitting the frame comprises transmitting an RNR element and an ML element in the frame, where the ML element does not have an RNR element in an STA profile of the ML element. In another example and to avoid duplication of BSS information, transmitting the frame comprises transmitting the ML element in the frame without another ML element in an STA profile of the ML element. In yet another example and to avoid duplication of BSS information, transmitting the frame comprises transmitting the ML element without the MBSSID element in an STA profile of the ML element.

For purposes of understanding and clarity, functionality to reduce duplication of BSS information and/or MLO information of a wireless device is described with respect to operations of an AP of an AP MLD. Similar functionality may be performed by a non-AP MLD without loss of generality and is not described herein for conciseness.

Figure 2:
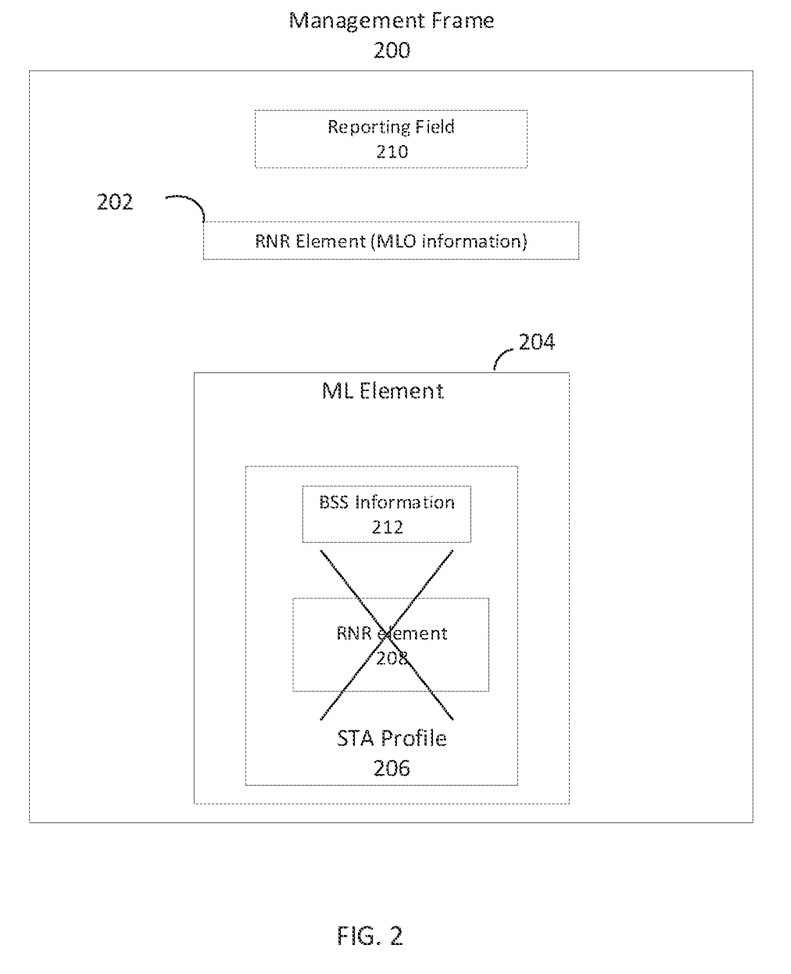
FIG. 2 illustrates an example frame transmitted by a wireless device which reduces duplication of MLO information of a wireless device in a frame.

FIG. 2 illustrates an example frame 200 transmitted by a wireless device which reduces duplication of MLO information. A wireless device such as a reporting AP may generate a management frame 200. The frame 200 may include BSS information of the reporting AP in a reporting field 210. Further, the frame 200 may have an RNR element 202 with MLO information of neighboring wireless devices to the reporting AP. For example and referring to FIG. 1, the reporting AP AP11 may generate an RNR element which includes MLO information of AP21, AP22, AP23, AP31, AP32, AP33. In some examples, the MLO information of APs on a same link as the reporting AP may not be provided in the RNR element 202.

The reporting AP may be affiliated with an MLD and generate an ML element 204 in the frame 200 with one or more STA profile 206. Each STA profile 206 of the ML element 204 is associated with an AP affiliated with the MLD and includes BSS information 212 of the affiliated AP. For example, reporting AP11 may provide an ML element in the frame which includes BSS information of AP21 and AP31 in a respective STA profile. STA profile for AP21 in the ML element would also typically include an RNR element with MLO information of AP11, AP12, AP13, AP31, AP32, and AP33 as if the reported AP21 transmits a management frame. Similarly, STA profile for AP31 in the ML element would typically include an RNR element with MLO information of AP21, AP22, AP23, AP11, AP12, and AP13 as if the reported AP31 transmits a management frame. The RNR element of the ML element would include duplicative MLO information of co-located APs already provided in the RNR element 202 and reporting field 210. In examples, the ML element 204 does not include an RNR element 208 in the STA profile 206 as shown by the "X" to avoid the duplication. Therefore, MLO information on all 8 co-located APs with AP11 are indicated in a frame without any duplication which would otherwise be included in RNR elements of an STA profile.

In an embodiment, when an AP that is affiliated with an AP MLD transmits a frame that includes a Reduced Neighbor Report (RNR) element, if an information of a first AP in the RNR element is to be duplicated in the frame, the AP does not include the information of the first AP more than once in the frame.

In an embodiment, an AP shall not include a RNR element in a Multi-Link (ML) element.

Figure 3:
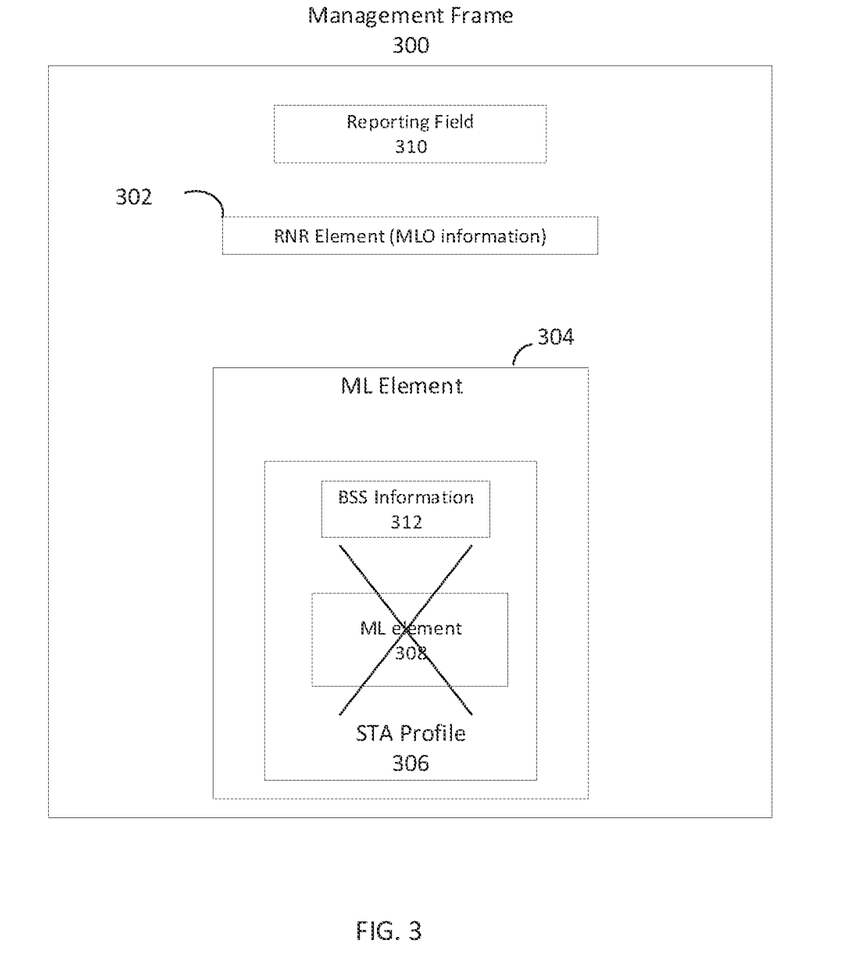
FIG. 3 illustrates an example frame transmitted by a wireless device which reduces duplication of BSS information of a wireless device in a frame.

FIG. 3 illustrates an example frame 300 transmitted by a wireless device which reduces duplication of BSS information. A wireless device such as a reporting AP may generate a management frame 300. The frame 300 may include BSS information of the reporting AP in a reporting field 310. Further, the frame 300 may have an RNR element 302 with MLO information of neighboring wireless devices to the reporting AP. For example and referring to FIG. 1, the reporting AP AP11 may generate an RNR element which includes MLO information of AP21, AP22, AP23, AP31, AP32, AP33. In some examples, the MLO information of APs on a same link as the reporting AP may not be provided in the RNR element 302.

The reporting AP may be affiliated with an MLD and also generate an ML element 304 in the frame 300 with one or more STA profiles 306 in the ML element 304. Each STA profile 306 of the ML element 304 is a field or data structure associated with an AP affiliated to the MLD and includes BSS information 312 of the AP affiliated to the MLD. For example, reporting AP11 may provide an ML element in the frame which includes BSS information of AP21 and AP31 in a respective STA profile. An STA profile 306 would also typically include an ML element 308. For instance, STA profile for AP21 in the ML element would also typically include an ML element as if the reported AP21 transmits a management frame and the ML element has BSS information of APs AP11 and AP31 affiliated with the MLD1. Similarly, STA profile for AP31 in the ML element would typically include an ML element as if the reported AP31 transmits a management frame and the ML element has BSS information of APs AP11 and AP21 affiliated with MLD1. The ML element 308 in the ML element 304 would include duplicative BSS information of co-located APs which is already provided in other STA profiles in the same frame. In examples, the ML element 304 does not include an ML element 308 in the STA profile 306 as shown by the "X" to avoid the duplication. Therefore, BSS information on all 8 co-located APs with AP11 are indicated in a frame without any duplication which would otherwise be included in ML elements in an STA profile.

In an embodiment, when an AP that is affiliated with an AP MLD transmits a frame that includes a Multi-Link (ML) element, if an information of a first AP in the ML element is to be duplicated in the frame, the AP does not include the information of the first AP more than once in the frame.

In an embodiment, an AP shall not include a ML element in another ML element in a frame.

Figure 4:
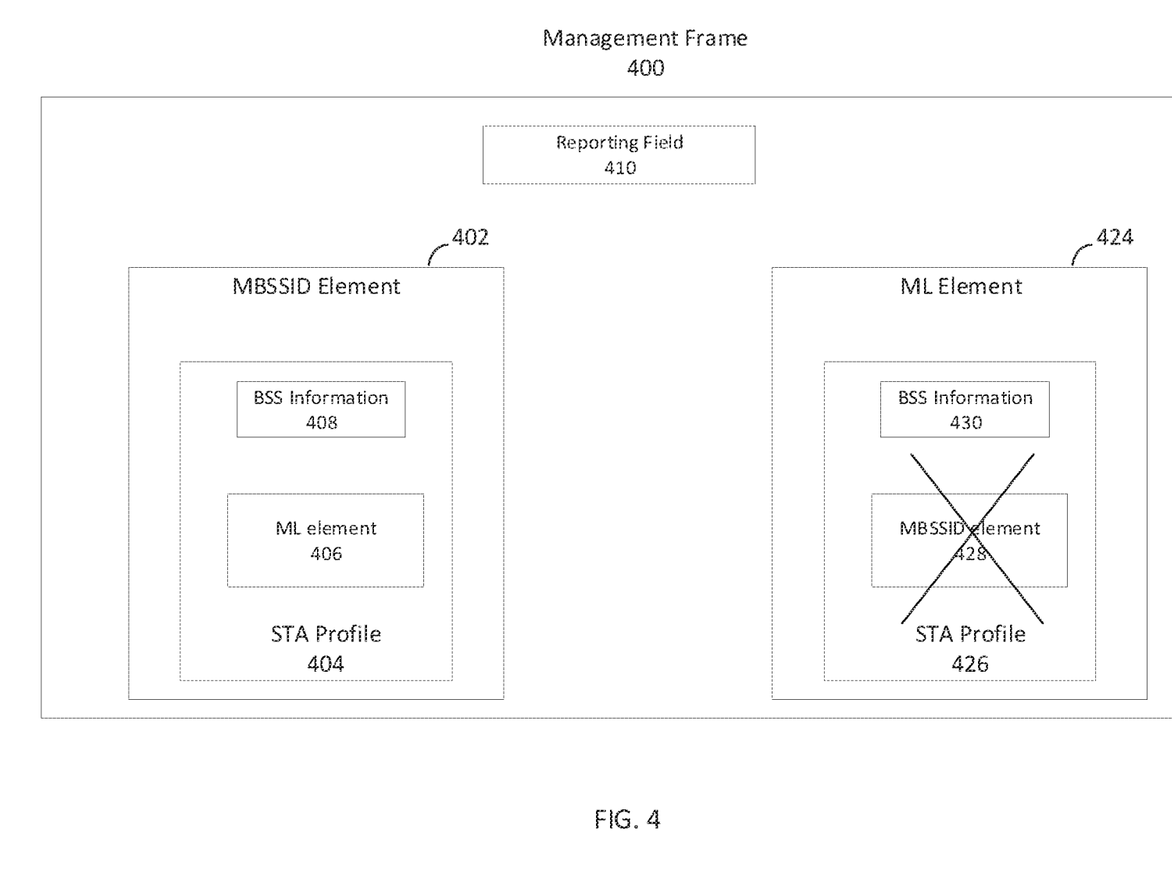
FIG. 4 illustrates another example frame transmitted by a wireless device which reduces duplication of BSS information of a wireless device in a frame.

FIG. 4 illustrates another example frame transmitted by a wireless device which reduces duplication of BSS information. In examples, BSS information of wireless devices are indicated in a frame without any duplication which would otherwise be included in the MBSSID element in an STA profile.

The wireless device such as a reporting AP may generate a management frame 400. The frame 400 may include BSS information of the reporting AP in a reporting field 410.

Further, the reporting AP may also generate an MBSSID element 402 in the frame 400 with one or more STA profiles 404 each associated with a wireless device such as a reported AP on a same link. Each STA profile 404 for the reported AP would also typically include BSS information 408 of the reported AP and an ML element 406 as if the reported AP of the STA profile 404 transmits a frame with BSS information of other APs affiliated with the same MLD as the reported AP. For example and referring to FIG. 1, AP11 may generate an MBSSID element in the frame 400 which identifies in an STA profile the BSS information (e.g., non-transmitted BSSID) of reported AP12. The STA profile of the MBSSID element for AP12 would then typically include an ML element of AP12 as if AP12 transmits a management frame with corresponding BSS information of APs affiliated with the same MLD as AP12 which are AP22 and AP32. Additionally, AP11 may generate the MBSSID element in the frame 400 which identifies in an STA profile with the BSS information (e.g., non-transmitted BSSIDs) of reported AP13. The STA profile of the MBSSID element for AP13 would then typically include an ML element of AP13 as if AP13 transmits a management frame with corresponding BSS information of APs affiliated with the same MLD as AP13 which are AP23 and AP33.

In an example, the management frame 400 may include an ML element 424 in the frame 400 with one or more STA profiles 426 each associated with an AP affiliated with the MLD and indicating respective BSS information 430. The STA profile 426 for an AP may also include an MBSSID element 428 with BSS information (e.g., non-transmitted BSSIDs) of other APs on a same link as the AP affiliated with the MLD. For example and referring to FIG. 1, AP11 may generate an ML element in the frame which identifies BSS information of AP21 and AP31 in a respective STA profile. Further, the STA profile for AP21 which is a reported AP would then typically include an MBSSID element with BSS information (e.g., non-transmitted BSSIDs) of AP22 and AP23. In examples, the STA profile 426 for the ML element 424 in the management frame 420 does not include the MBSSID element 428 as shown by the "X" to avoid duplication of BSS information of a wireless device in an STA profile of the ML element 424 having an MBSSID element 428. In the example, MBSSID element 428 is not included in the ML element 424 to avoid a duplicated BSS information of AP22 which is already indicated by ML element 406 included in the MBSSID element 402 of the reporting AP.

In an embodiment, when a first AP that is affiliated with an AP MLD transmits a frame that include a Multi-Link (ML) element, if a STA profile of the ML element corresponds to a second AP that is affiliated with the AP MLD and a BSSID of the second AP is a transmitted BSSID where the second AP configures multiple BSSID set, the STA profile of the ML element does not include information on BSSID(s) associated with the second AP on the same link.

In an embodiment, the STA profile of the ML element shall not include an MBSSID element.

Figure 5:
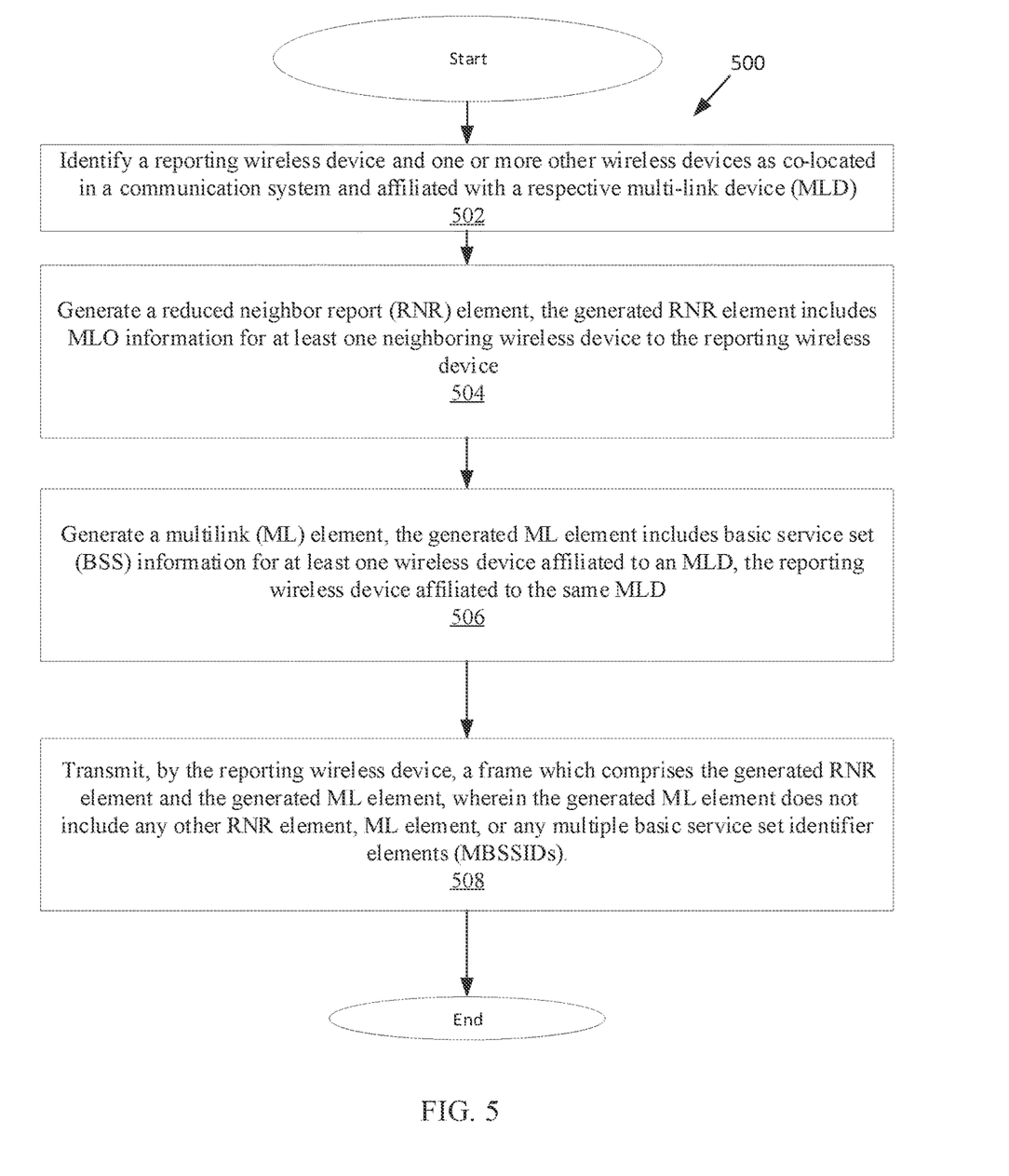
FIG. 5 is a flow chart of an example method associated with reducing duplication of MLO information and/or BSS information of a wireless device in a frame.

FIG. 5 is a flow chart of an example method 500 associated with reducing duplication of BSS information and/or MLO information of a wireless device in a management frame. The wireless device may be an AP or an non-AP STA. At step 502, a reporting wireless device and one or more other wireless devices are identified as co-located in a communication system and affiliated with a respective multi-link device (MLD). At step 504, a reduced neighbor report (RNR) element is generated where the generated RNR element includes MLO information of at least one neighboring wireless device to the reporting wireless device. At step 506, a multilink (ML) element is generated where the generated ML element includes basic service set (BSS) information of at least one wireless device affiliated to an MLD, the reporting wireless device affiliated to the same MLD. At 508, the reporting wireless device transmits a frame which comprises the generated RNR element and the generated ML element, wherein the generated ML element does not include any other RNR element, ML element, or any multiple basic service set identifier elements (MBSSIDs). The exclusion of elements as described reduces duplication of BSS information and/or MLO information of a wireless device in a management frame.

Figure 6:
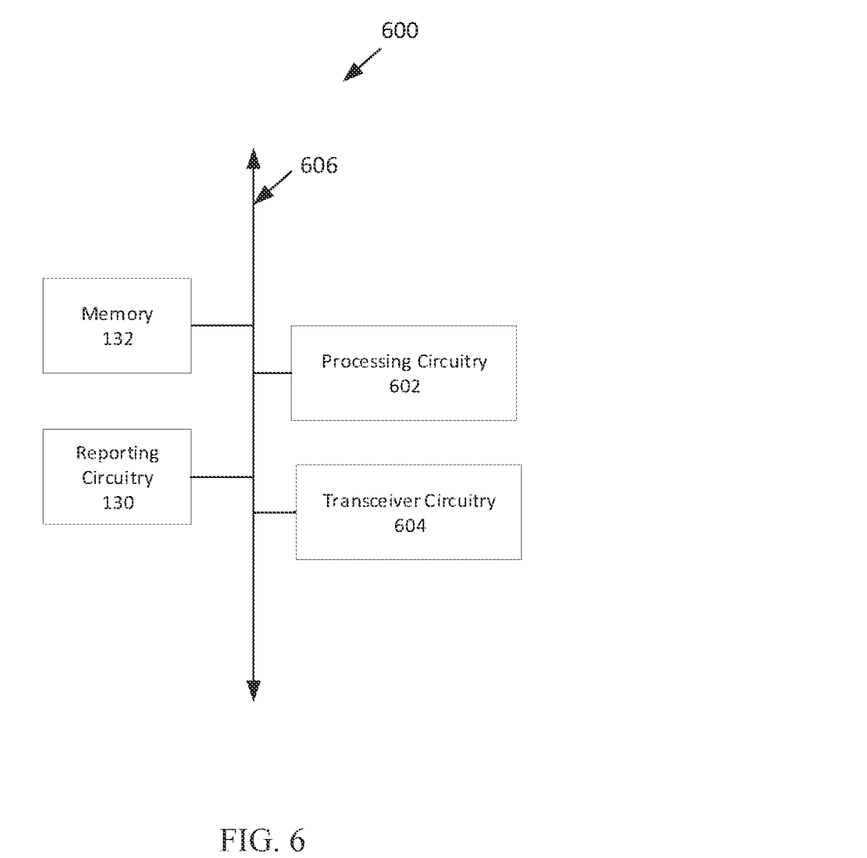
FIG. 6 illustrates an example system diagram of an MLD which reduces duplication of BSS information and/or MLO information of a wireless device in a frame.

FIG. 6 illustrates an example system diagram 600 of an MLD which reduces duplication of one or more of BSS information and/or MLO information in a frame such as a management frame. The system diagram 600 shows the MLD capable of providing communications consistent with the standards and protocols described herein. Processing circuitry 602 along with the reporting circuitry 130 may comprise control circuitry that effects the processing described herein to transmit on wireless links and reduce duplication of one or more of BSS information and/or MLO information in a frame. Transceiver circuitry 604 may transmit and/or receive management frames as described herein and may include one or more of RNR elements, ML elements, and MBSSID elements. Memory 132 may be used to store instructions to effect the processing described herein and store the MLD table 134. The processing circuitry 602, the transceiver circuitry 604, and the memory 130 may be coupled to an interconnect 606 such as a bus (e.g., PCI, ISA, PCI-Express).

In one embodiment, a method is disclosed. The method comprises: generating a reduced neighbor report (RNR) element, the RNR element includes multi-link operation (MLO) information of at least one neighboring wireless device to a wireless device, the generated RNR element includes MLO information of each of at least one neighboring wireless device to a reporting wireless device, the MLO information of the generated RNR element defines information of a respective multi-link device (MLD) which each at least one neighboring wireless device to the reporting wireless device is affiliated, the reporting wireless device and the at least one neighboring wireless device to the reporting wireless device being co-located in a communication system; generating a multilink (ML) element, the ML element includes basic service set (BSS) information of at least one wireless device affiliated to a particular MLD, the generated ML element includes basic service set (BSS) information of at least one wireless device affiliated to an MLD, the reporting wireless device affiliated to the same MLD; and transmitting, by the reporting wireless device, a frame which comprises the generated RNR element and the generated ML element, wherein the generated ML element does not include any other RNR element. In an embodiment, the generated ML element does not include any other ML element. In an embodiment, the MLO information of the generated RNR element includes one or more of a link identifier for a link of a respective MLD, an MLD identifier of a respective MLD, and an MLD configuration change indication for a respective MLD. In an embodiment, the BSS information includes one or more capabilities and operating parameters of a respective BSS which each of the at least one wireless device affiliated with the MLD is associated. In an embodiment, transmitting the frame comprises transmitting, by the reporting wireless device, a frame which is a beacon or a probe response sent in response to a probe request, the frame further comprising MLO information of the reporting wireless device which defines information of an MLD which the reporting wireless device is affiliated. In an embodiment, the reporting wireless device, the at least one wireless device affiliated to the MLD and the at least one neighboring wireless device are access points (APs). In an embodiment, the generated ML element does not include any multiple basic service set identifier elements (MBSSIDs), the MBSSID elements including BSS information of wireless devices on a same wireless link. In an embodiment, the frame comprises an MBSSID element, the MBSSID element including BSS information of wireless devices on a same wireless link, the MBSSID element including BSS information of a third wireless device and BSS information of a fourth wireless device on the same wireless link. In an embodiment, the frame comprises only one instance of the BSS information of the third and fourth wireless device. In an embodiment, the frame comprises only one instance of the MLO information of each of the at least one neighboring wireless device to the reporting wireless device and only one instance of the BSS information of each of the at least one wireless device affiliated to the MLD.

In another embodiment, a communication system is disclosed. The communication system comprises: first circuitry to generate a reduced neighbor report (RNR) element, the RNR element includes multi-link operation (MLO) information of at least one neighboring wireless device to a wireless device, the generated RNR element includes MLO information of each of at least one neighboring wireless device to a reporting wireless device, the MLO information of the generated RNR element defines operational information of a respective multi-link device (MLD) which each at least one neighboring wireless device to the reporting wireless device is affiliated, the reporting wireless device and the at least one neighboring wireless device to the reporting wireless device being co-located in a communication system; second circuitry to generate a multilink (ML) element, the ML element includes basic service set (BSS) information of at least one wireless device affiliated to a particular MLD, the generated ML element includes basic service set (BSS) information of at least one wireless device affiliated to an MLD, the reporting wireless device affiliated to the same MLD; third circuitry to transmit, by the reporting wireless device, a frame which comprises the generated RNR element and the generated ML element, wherein the generated ML element does not include any other RNR element. In an embodiment, the generated ML element does not include any other ML element. In an embodiment, the MLO information of the generated RNR element includes one or more of a link identifier for a link of a respective MLD, an MLD identifier for a respective MLD, and an MLD configuration change indication for a respective MLD. In an embodiment, the BSS information includes one or more capabilities and operating parameters of a respective BSS which each of the at least one wireless device affiliated with the MLD is associated. In an embodiment, the third circuitry to transmit the frame comprises circuitry to transmit, by the reporting wireless device, the frame which is a beacon or a probe response in response to a probe request, the frame further comprising MLO information of the reporting wireless device which defines information of an MLD which the reporting wireless device is affiliated. In an embodiment, the reporting wireless device, the at least one wireless device affiliated to the MLD, and the at least one neighboring wireless device are access points (APs). In an embodiment, the generated ML element does not include any multiple basic service set identifier elements (MBSSIDs), the MBSSID elements including BSS information of wireless devices on a same wireless link. In an embodiment, the frame comprises an MBSSID element, the MBSSID elements including BSS information of wireless devices on a same wireless link, the MBSSID element in the frame including BSS information associated with a third wireless device and BSS information associated with a fourth wireless device on the same wireless link. In an embodiment, the frame comprises only one instance of the BSS information of the third and fourth wireless device. In an embodiment, the frame comprises only one instance of the MLO information of each of the at least one neighboring wireless device to the reporting wireless device and only one instance of the BSS information of each of the at least one wireless device affiliated to the MLD.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method comprising:
generating a reduced neighbor report (RNR) element, the RNR element includes multi-link operation (MLO) information of at least one neighboring wireless device to a wireless device, the generated RNR element includes MLO information of each of at least one neighboring wireless device to a reporting wireless device, the MLO information of the generated RNR element defines information of a respective multi-link device (MLD) which each at least one neighboring wireless device to the reporting wireless device is affiliated, the reporting wireless device and the at least one neighboring wireless device to the reporting wireless device being co-located in a communication system and a first wireless device of the at least one neighboring wireless device is affiliated with a first MLD and coupled to a first link and the reporting wireless device is affiliated with a second MLD and coupled to a second link, wherein the first MLD and the second MLD facilitates communication over the first link and the second link and the generated RNR element includes MLO information for the first wireless device affiliated with the first MLD and not MLO information of any wireless device affiliated with the first MLD which shares the second link with the reporting wireless device;
generating a multilink (ML) element, the ML element includes basic service set (BSS) information of at least one wireless device affiliated to a particular MLD, the generated ML element includes basic service set (BSS) information of at least one wireless device affiliated to the second MLD, the reporting wireless device affiliated to the second MLD and the BSS information is not included in any RNR element in the ML element; and
transmitting, by the reporting wireless device, a management frame which comprises the generated RNR element and the generated ML element, wherein the generated ML element always excludes any RNR element, and wherein information of the at least one wireless device affiliated to the MLD is not duplicated in the management frame having the RNR element and the ML element.

2. The method of claim 1, wherein the generated ML element does not include any other ML element.

3. The method of claim 1, wherein the MLO information includes one or more of a link identifier for a link of a respective MLD, an MLD identifier of a respective MLD, and an MLD configuration change indication for a respective MLD.

4. The method of claim 1, wherein the BSS information includes one or more capabilities and operating parameters of a respective BSS.

5. The method of claim 1, wherein transmitting the frame comprises transmitting, by the reporting wireless device, a frame which is a beacon or a probe response sent in response to a probe request, the frame further comprising MLO information of the reporting wireless device which defines information of an MLD which the reporting wireless device is affiliated.

6. The method of claim 1, wherein the reporting wireless device, the at least one wireless device affiliated to the MLD and the at least one neighboring wireless device are access points (APs).

7. The method of claim 1, wherein the generated ML element does not include any multiple basic service set identifier elements (MBSSIDs), the MBSSID elements including BSS information of wireless devices on a same wireless link.

8. The method of claim 1, wherein the frame comprises an MBSSID element, the MBSSID element including BSS information of wireless devices on a same wireless link, the MBSSID element including BSS information of a third wireless device and BSS information of a fourth wireless device on the same wireless link.

9. The method of claim 8, wherein the frame comprises only one instance of the BSS information of the third and fourth wireless device.

10. The method of claim 1, wherein the frame comprises only one instance of the MLO information of each of the at least one neighboring wireless device to the reporting wireless device and only one instance of the BSS information of each of the at least one wireless device affiliated to the MLD.

11. A communication system comprising:
first circuitry to generate a reduced neighbor report (RNR) element, the RNR element includes multi-link operation (MLO) information of at least one neighboring wireless device to a wireless device, the generated RNR element includes MLO information of each of at least one neighboring wireless device to a reporting wireless device, the MLO information of the generated RNR element defines information of a respective multi-link device (MLD) which each at least one neighboring wireless device to the reporting wireless device is affiliated, the reporting wireless device and the at least one neighboring wireless device to the reporting wireless device being co-located in a communication system and a first wireless device of the at least one neighboring wireless device is affiliated with a first MLD and coupled to a first link and the reporting wireless device is affiliated with a second MLD and coupled to a second link, wherein the first MLD and the second MLD facilitates communication over the first link and the second link and the generated RNR element includes MLO information for the first wireless device affiliated with the first MLD and not MLO information of any wireless device affiliated with the first MLD which shares the second link with the reporting wireless device;
second circuitry to generate a multilink (ML) element, the ML element includes basic service set (BSS) information of at least one wireless device affiliated to a particular MLD, the generated ML element includes basic service set (BSS) information of at least one wireless device affiliated to the second MLD, the reporting wireless device affiliated to the second MLD and the BSS information is not included in any RNR element in the ML element; and
third circuitry to transmit, by the reporting wireless device, a management frame which comprises the generated RNR element and the generated ML element, wherein the generated ML element always excludes any RNR element, and wherein information of the at least one wireless device affiliated to the MLD is not duplicated in the management frame having the RNR element and the ML element.

12. The communication system of claim 11, wherein the generated ML element does not include any other ML element.

13. The communication system of claim 11, wherein the MLO information includes one or more of a link identifier for a link of a respective MLD, an MLD identifier for a respective MLD, and an MLD configuration change indication for a respective MLD.

14. The communication system of claim 11, wherein the BSS information includes one or more capabilities and operating parameters of a respective BSS.

15. The communication system of claim 11, wherein the third circuitry to transmit the frame comprises circuitry to transmit, by the reporting wireless device, the frame which is a beacon or a probe response in response to a probe request, the frame further comprising MLO information of the reporting wireless device which defines information of an MLD which the reporting wireless device is affiliated.

16. The communication system of claim 11, wherein the reporting wireless device, the at least one wireless device affiliated to the MLD, and the at least one neighboring wireless device are access points (APs).

17. The communication system of claim 11, wherein the generated ML element does not include any multiple basic service set identifier elements (MBSSIDs), the MBSSID elements including BSS information of wireless devices on a same wireless link.

18. The communication system of claim 11, wherein the frame comprises an MBSSID element, the MBSSID elements including BSS information of wireless devices on a same wireless link, the MBSSID element in the frame including BSS information associated with a third wireless device and BSS information associated with a fourth wireless device on the same wireless link.

19. The communication system of claim 18, wherein the frame comprises only one instance of the BSS information of the third and fourth wireless device.

20. The communication system of claim 11, wherein the frame comprises only one instance of the MLO information of each of the at least one neighboring wireless device to the reporting wireless device and only one instance of the BSS information of each of the at least one wireless device affiliated to the MLD.

* * * * *